United States Patent [19]

Tentler et al.

[11] Patent Number: 4,554,581

[45] Date of Patent: Nov. 19, 1985

[54] STV DECODER WITH IMPROVED DATA SIGNAL RECOGNITION CAPABILITY

[75] Inventors: Michael Tentler, Wheeling; David L. Walker, Arlington Hts.; Wayne E. Bretl, Schaumburg; Gregory A. Williams, Elk Grove Village, all of Ill.

[73] Assignee: Zenith Radio Corporation, Glenview, Ill.

[21] Appl. No.: 701,713

[22] Filed: Feb. 14, 1985

Related U.S. Application Data

[63] Continuation of Ser. No. 450,817, Dec. 20, 1982, abandoned.

[51] Int. Cl.$^4$ .......................... H04N 7/16; H04N 5/52
[52] U.S. Cl. ..................................... 358/120; 358/114; 358/176; 358/178
[58] Field of Search ................ 358/114, 120, 176, 178

[56] References Cited

U.S. PATENT DOCUMENTS

| | | | |
|---|---|---|---|
| 4,100,575 | 7/1978 | Morio et al. | 358/120 |
| 4,222,068 | 9/1980 | Thompson et al. | 358/120 |
| 4,253,114 | 2/1981 | Tang et al. | 358/120 |
| 4,360,825 | 11/1982 | Srivastava | 358/176 |
| 4,408,225 | 10/1983 | Ensinger et al. | 358/120 |

Primary Examiner—S. C. Buczinski
Assistant Examiner—Melissa Koltak

[57] ABSTRACT

An addressable subscription television decoder includes an input stage including an IF amplifier for converting a scrambled RF television signal to a composite baseband video signal. The baseband video signal comprises either a nominal sync component or a sync component having suppressed horizontal sync pulses during video fields and having non-suppressed sync pulses during vertical intervals, the vertical intervals also including selected encoded data signals. An AGC voltage for controlling the gain of the IF amplifier is developed by a circuit exhibiting a relatively short time constant whenever the composite baseband video signal is characterized by nominal level sync pulses, the time constant being increased in response to suppressed horizontal sync pulses. The sync pulses produced during the vertical intervals of the composite baseband video signal are thereby not subjected to excessive IF gain for facilitating processing of the data signals by the decoder.

12 Claims, 5 Drawing Figures

STV DECODER WITH IMPROVED DATA SIGNAL RECOGNITION CAPABILITY

This application is a continuation of application Ser. No. 450,817, filed Dec. 20, 1982, now abandoned.

BACKGROUND OF THE INVENTION

The present invention relates generally to addressable subscription television decoders and more particularly concerns apparatus for increasing the probability that a broadcast address code will be properly recognized by such a decoder.

Subscription television systems employing addressable decoders are well known in the art. Exemplary of such systems is that disclosed in U.S. Pat. No. 4,222,068 to Thompson. In the Thompson system, as well as in other known similar systems, television signals are broadcast in a scrambled form from a head-end facility to each of a plurality of system subscribers. Various data signals such as subscriber address codes, subscriber authorization codes and program codes may be encoded in the vertical intervals of a broadcast television signal at the head-end facility so as to enable head-end control of the program viewing authorization of each system subscriber. In particular, each system subscriber is provided with a decoder having a unique address and including a memory for storing data reflecting the subscriber's program authorization status. In order to initialize or update the program authorization status of any particular subscriber, that subscriber's unique address code together with an authorization code representing the desired subscriber program authorization status is encoded in the vertical interval of the transmitted television signal. The subscriber's decoder is responsive to the transmitted address code for storing the associated program authorization code in memory whereby the entire authorization procedure is completed from the head-end facility.

The program codes encoded in the vertical intervals of the transmitted television signals identify one or more program categories reflecting the programming content (e.g. sports, news, movies, etc.) of the accompanying signal. The received program codes are compared with the stored program authorization status in each subscriber's decoder to determine whether or not the subscriber is authorized to decode the accompanying television signal. If the comparison indicates that a subscriber is authorized for viewing a particular television signal, an unscrambling circuit in the subscriber's decoder is enabled for unscrambling the television signal, the decoder otherwise coupling the received television signal in a scrambled and thereby unviewable form to the subscriber's television receiver.

One known technique for scrambling a transmitted television signal involves suppressing the horizontal sync pulses during the video fields. In this scrambling technique, the sync pulses occuring during the vertical intervals of the television signal are normally not suppressed in order to facilitate data reception by the decoder. While this technique provides for adequate video scrambling, it has the undesireable characteristic of reducing the probability of proper data recognition by the decoder.

More specifically, in order to process the data encoded in the vertical intervals of a transmitted television signal, the received signal must initially be converted to a baseband form. In order to maintain proper operating signal levels, an AGC circuit is typically used to control the gain of the IF stage of the decoder in response to the level of the detected baseband video signal. In particular, the AGC circuit is gated for sampling the horizontal sync tip levels of the detected video signal for adjusting the gain of the IF stage to maintain the detected signal at a substantially constant level. In the foregoing example of a scrambled television signal characterized by fields of suppressed horizontal sync pulses, the AGC circuit will therefore tend to increase the gain of the IF stage in an attempt to compensate for the reduced horizontal sync tip levels of the detected video signal. As a consequence, the non-suppressed sync pulses characterizing the vertical intervals of the transmitted video signal are subjected to increased gain such that the detected sync pulses are produced at excessive signal level. Since recognition of the data signals encoded in the horizontal lines of the vertical intervals of the transmitted signal is generally referenced in relation to the vertical sync pulses, the probability of proper data signal recognition by the decoder is substantially reduced due to the abnormal signal levels of the vertical sync pulses. As a result of this decreased data signal recognition probability, an excessive period of time may transpire before the data, which is redundantly transmitted on a cyclical basis, is properly recognized by a given decoder. That is, each time that a transmitted address code identifying a particular decoder is not properly recognized thereby, the decoder must wait a certain period of time before its address code is retransmitted. This effect can therefore substantially delay initialization of or changes in decoder program authorization status, such delays being highly undesireable from the viewpoint of both the system operator as well as the system subscribers.

It is therefore a basic object of the present invention to provide an improved addressable decoder for a subscription television system.

It is a more specific object of the invention to provide an addressable decoder for a subscription television system which is characterized by the ability to properly recognize transmitted data to a high degree of probability.

BRIEF DESCRIPTION OF THE DRAWINGS

The features of the invention which are believed to be novel are set forth with particularity in the appended claims. The invention, together with its objects and the advantages thereof, may best be understood by reference to the following description taken in conjunction with the accompanying drawings, in which like reference numerals identify like elements in the several figures and in which:

DESCRIPTION OF THE PREFERRED EMBODIMENTS

Figure 1:
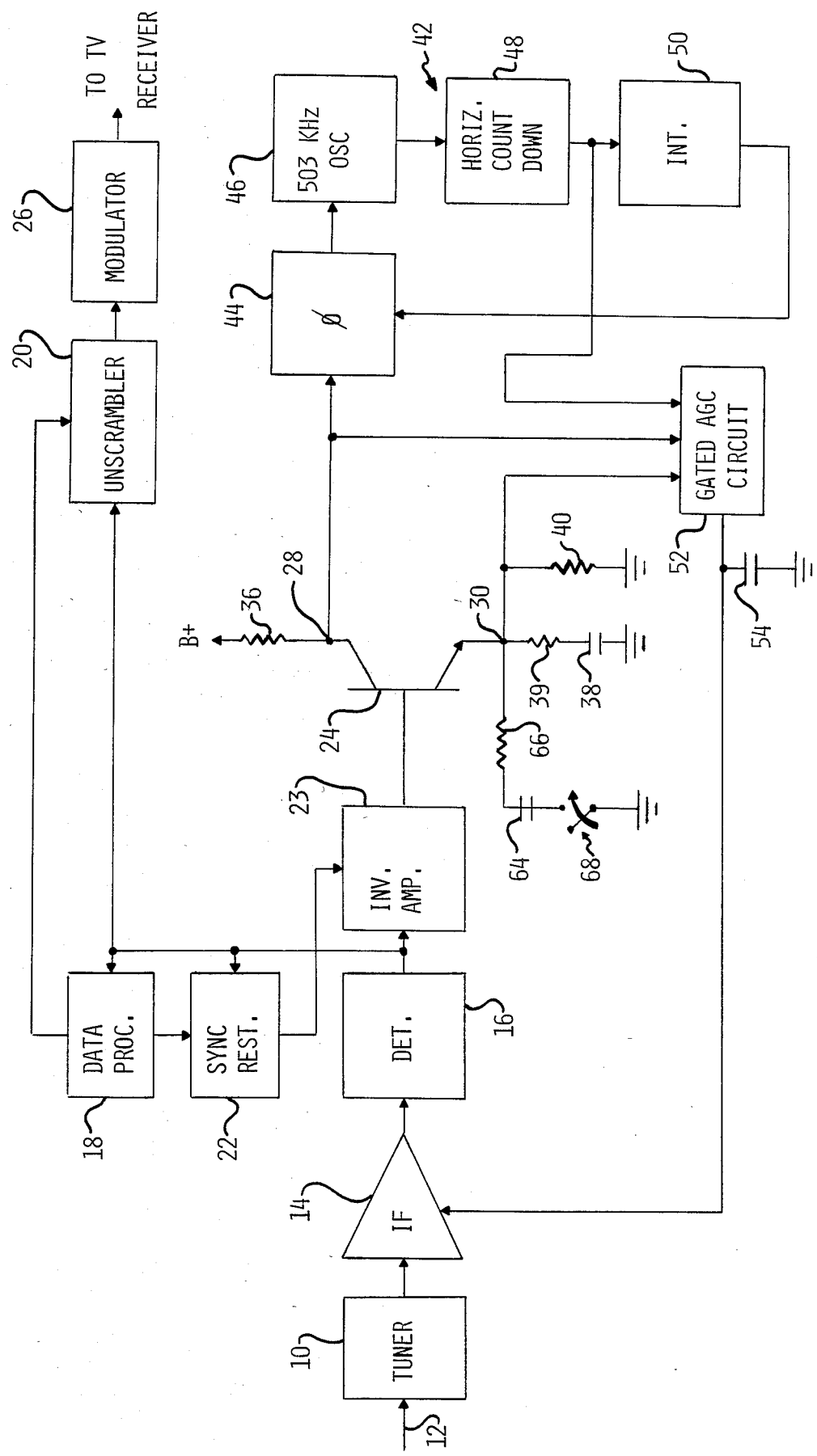
FIG. 1 is a circuit diagram illustrating an addressable decoder including the apparatus of the present invention which is shown in conceptual form.

Referring now to the drawings, FIG. 1 illustrates an addressable subscription television signal decoder incorporating the present invention. The decoder may be generally of the type disclosed in previously mentioned U.S. Pat. No. 4,222,068 and is adapted for receiving and processing a standard RF television signal or an RF television signal having a scrambled video component. Video component scrambling is achieved by suppressing the horizontal sync pulses during fields of the composite baseband video signal, the sync components occurring during the vertical intervals between successive video fields being non-suppressed for facilitating the processing of data signals encoded therein. In addition, video scrambling may be further enhanced by inverting the video fields on a random basis. The data signals encoded in the vertical intervals of the composite baseband video signal, which render the decoder addressable from a head-end facility, may include address codes, subscriber authorization codes and program codes. The address and subscriber authorization codes are used to provide head-end control of the subscriber's program auuthorization status while the program code is used to identify the program content or category of the accompanying television signal.

Referring in detail to FIG. 1, the decoder includes a tuner 10 for converting an RF subscription television signal, supplied for example over a cable 12, to a standard television intermediate frequency (IF) signal which is processed by a gain-controlled IF amplifier 14. The ouptut of the IF amplifier 14 is supplied to a conventional video detector 16 for developing a negative polarity composite baseband video signal which is coupled to a data processing circuit 18, an unscrambler circuit 20, a sync restoration circuit 22 and inverting amplifier 23.

The data processing circuit 18 is responsive to the data signals encoded in the vertical intervals of the negative polarity composite baseband video signal developed by detector 16 for storing the subscriber's program authorization status as determined at the head-end transmitting facility. More particularly, the data processing circuit 18 of each subscriber's decoder is characterized by a unique address which is continuously compared with the address codes encoded in the vertical intervals of a received signal. Upon detecting a match therebetween, an encoded authorization code associated with the matching received address code is used to either initialize or update the subscriber's stored program authorization status. The encoded program code identifying the programming category of a received signal is then compared with the subscriber's stored program authorization status to determine whether or not the subscriber is authorized for viewing the particular program. If the determination is that the subscriber is so authorized, the sync restoration circuit 22 is suitably enabled by the data processing circuit 18 for supplying a signal to inverting amplifier 23 for restoring the suppressed sync pulses to their nominal levels. At the same time, the unscrambler circuit 20 is operated for establishing proper video signal polarities at its output. The restored and unscrambled baseband video signal is then coupled to a modulator 26 and therefrom to the subscriber's television receiver for viewing. If, on the other hand, the determination is that the subscriber is not authorized, neither will the sync pulses be restored nor will proper video polarities be established such that a scrambled and unviewable signal is coupled to the subscriber's television receiver.

The positive polarity composite baseband video signal developed at the output of inverting amplifier 23 is coupled to the base of a transistor 24. Transistor 24 serves two basic purposes which are the development of a composite sync signal at its collector terminal 28 and the development of an automatic gain control (AGC) voltage at its emitter terminal 30.

Figure 2:
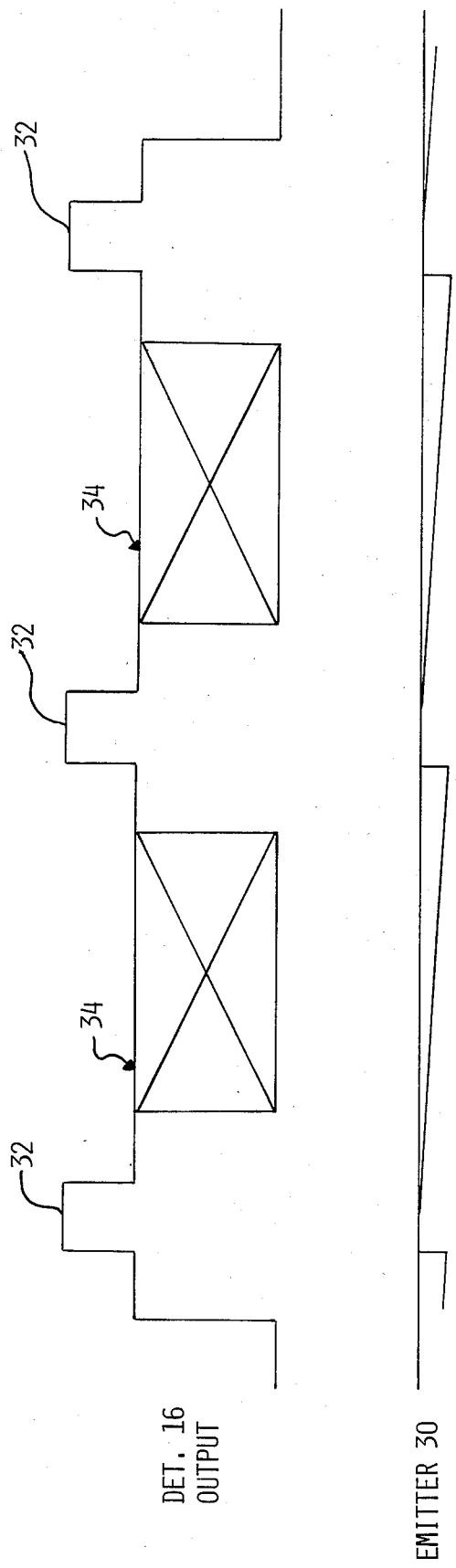
FIGS. 2 and 3 depict various waveforms illustrating the operation of the present invention.

Referring to FIG. 2, the top waveform depicts a standard positive polarity composite baseband video signal including non-suppressed horizontal sync pulses 32 separated by horizontal video lines 34. Transistor 24 is biased for conducting in response to each sync pulse 32 and for otherwise assumming a non-conductive state. Therefore, transistor 24 couples a current from a source of positive supply potential B+, which is connected to the transistor's collector terminal 28 by a resistor 36, to a parallel RC circuit comprising a capacitor 38, including a series connected limiting resistor 39, and a resistor 40 in response to each horizontal sync pulse 32. The capacitor 38 thereby rapidly charges to a maximum voltage at the beginning of each horizontal sync pulse 32 and is maintained at this voltage level until the respective horizontal sync pulse transpires as illustrated by the middle waveform of FIG. 2. After the occurrence of each horizontal sync pulse 32, the capacitor discharges at a relatively rapid rate through resistor 40 as shown. The component values of capacitor 38 and resistors 39 and 40 are selected for establishing a relatively short time constant, typically on the order of about one millisecond to facilitate this rapid discharge which is necessary for enabling the AGC voltage developed at the emitter terminal 30 to quickly respond to changes in the video signal level. However, due to this short time constant and the resulting rapid discharge rate, the AGC voltage developed at the emitter terminal 30 of the transistor will discharge to an AGC lockout level in response to a video signal lacking horizontal sync pulses within only a few horizontal scanning lines.

The bottom waveform of FIG. 2 illustrates the composite sync signal developed at the collector terminal 28 of the transistor. The composite sync signal, which is high during the transistor's non-conductive states and low during its conductive states, is applied to a phase lock loop (PLL) 42 for synthesizing horizontal flyback pulses. The PLL 42 comprises a phase comparator 44 having a first input receiving the composite sync signal developed at the collector of transistor 24 and an output for controlling a 503 KHz oscillator 46. The ouptut of oscillator 46 is applied to a horizontal countdown circuit 48 for developing the horizontal flyback pulses, which pulses are integrated by an integrator 50 for producing a sawtooth waveform which is fed back to the second input of phase comparator 44 such that the flyback pulses are locked in phase with the composite sync signal.

The flyback pulses developed at the output of horizontal countdown circuit 48 and the composite sync signal developed at the collector of transistor 24 are applied as gating signals to a conventional gated AGC circuit 52. AGC circuit 52 is responsive to coincidence between a flyback pulse and a horizontal sync pulse for sampling the AGC voltage developed at the emitter of transistor 24 and for storing the sampled voltage on a capacitor 54. The AGC voltage stored by capacitor 54 is supplied to the gain control input of IF amplifier 14 to maintain the detected video signal at a substantially constant level.

As previously mentioned, the foregoing AGC system is nominally designed for operation in conjunction with a video signal having non-suppressed or nominal level sync components. In this case, the AGC voltage (see FIG. 2) discharges at a relatively rapid rate between horizontal sync pulses to track level changes in the video signal and re-charges in response to each sync pulse. However, in the case of a video signal having suppressed horizontal sync components, this re-charging operation does not consistently take place. Thus, in a subscription television system in which there is transmitted a television signal having video fields characterized by suppressed horizontal sync pulses and vertical intervals characterized by non-suppressed sync pulses an AGC system of the foregoing type will produce an AGC voltage as depicted by waveform 60 of FIG. 3. This waveform represents an AGC voltage which decays rapidly to an AGC lockout level following each vertical interval and remains at this abnormally low level until the next succeeding vertical interval. As a consequence, IF amplifier 14 is operated at an extremely high level of gain such that the sync components at the beginning of the succeeding vertical interval are developed at levels well beyond the nominal sync tip level. Since recognition of the data signals encoded in the vertical interval is referenced to or dependent upon the existance of nominal level vertical sync (vertical sync typically being integrated for providing the timing signals necessary to define the location of the data signals), the excessive vertical sync levels resulting from the increased gain of IF amplifier 14 significantly reduce the probability of data signal recognition.

Figure 3:
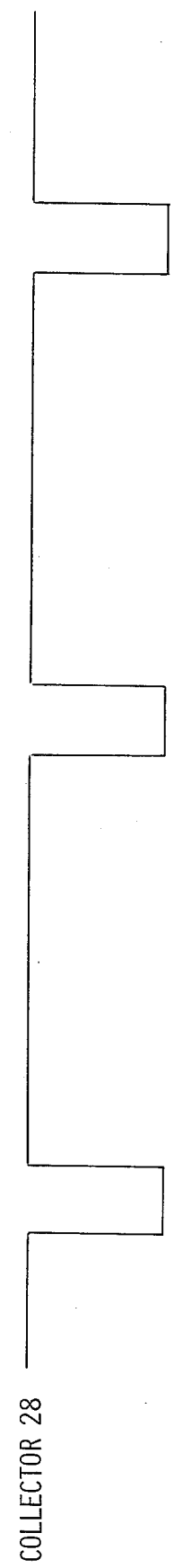
Figure 3:
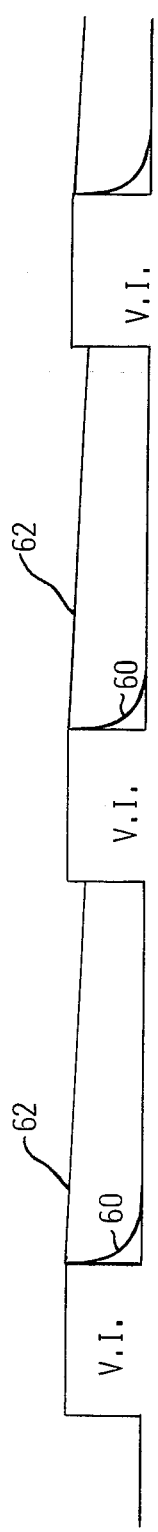

The foregoing problem is overcome according to the present invention by selectively increasing the time constant characterizing the RC circuit comprising capacitor 38 and resistors 39 and 40 to a value of about 200 milliseconds such that the rate of decay of the AGC voltage between successive vertical intervals is reduced as illustrated by waveform 62 of FIG. 3. In particular, the rate of decay of the AGC voltage is reduced such that the gain of IF amplifier 14 is maintained at a level for producing substantially nominal level vertical sync pulses at the beginning of each vertical interval. It will be recognized that the effect of the foregoing is to increase the probability of proper data signal recognition.

With reference to FIG. 1, the foregoing is accomplished by means of a second RC circuit comprising a series connected capacitor 64 and resistor 66 which are selectively connected to the emitter terminal 30 of transistor 24 by a switch 68 whenever it is desired to increase the AGC time constant for reducing the rate of decay of the AGC voltage.

Figure 4:
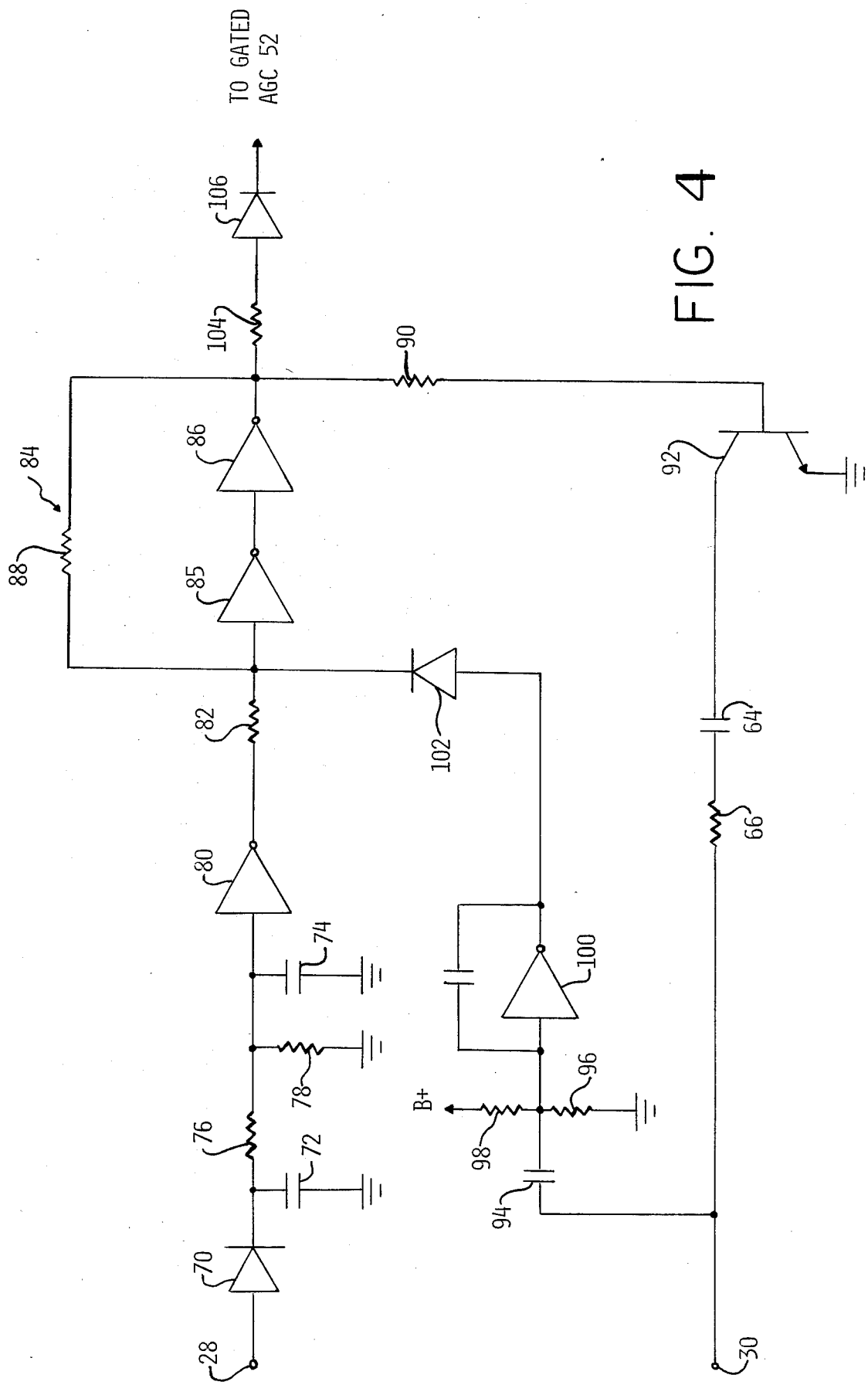
FIG. 4 is a schematic diagram illustrating a preferred embodiment of the present invention.

FIG. 4 schematically illustrates a preferred embodiment of the time constant increasing circuit of the invention which is conceptually illustrated in FIG. 1. In the circuit of FIG. 4, the time constant characterizing the RC circuit connected to the emitter terminal 30 of transistor 24 is automatically increased or decreased depending upon whether the detected video signal is characterized by suppressed or non-suppressed horizontal sync pulses.

More specifically, the composite sync signal developed at the collector 28 of transistor 24 is coupled through a rectifying diode 70 to an RC circuit comprising a pair of capacitors 72 and 74 and a pair of resistors 76 and 78. The output of this RC circuit will be low in response to a composite sync signal which is suppressed during the fields of the detected video signal and will be high for a non-suppressed composite sync signal. The high or low level output of the RC circuit is inverted by an inverter 80 and applied through a resistor 82 to a flip-flop 84 comprising a pair of inverters 84 and 86 and a feedback resistor 88. Thus, the output of flip-flop 84 is switched to a high logic state in response to a composite sync signal having suppressed horizontal sync pulses and is switched to a low logic state in response to a non-suppressed composite sync signal. The output of flip-flop 84 is connected by a resistor 90 to the base of a switching transistor 92 whose collector is connected to the series RC circuit comprising capacitor 64 and resistor 66 connected to the emitter terminal 30 of transistor 24.

The emitter terminal 30 of transistor 24 is also connected to a DC blocking capacitor 94. Capacitor 94 is connected through a voltage divider comprising resistors 96 and 98 to the input of an inverter 100 whose output is supplied through a diode 102 to the input of the flip-flop 84.

In operation, the output of flip-flop 84 will go logically low when a non-suppressed composite sync signal is developed at the collector terminal 28 of transistor 24. As a result, transistor 92 will assume a non-conductive state whereby capacitor 64 and resistor 66 are not connected to the emitter of transistor 24. The AGC system will thereby function in its normal short time constant mode for producing a substantially DC AGC voltage at the emitter terminal 30 of transistor 24 as represented by the middle waveform of FIG. 2. This substantially DC AGC voltage will be blocked by capacitor 94 so that it will not effect the state of flip-flop 84.

The AGC voltage developed at the emitter terminal 30 of transistor 24 will begin to rapidly decay in response to the composite sync signal transitioning from non-supressed to suppressed horizontal sync pulses. Capacitor 94 will quickly respond to the decaying AGC voltage for coupling a signal pulse through inverter 100 and diode 102 for switching the state of flip-flop 84 to a logically high output. As a result, transistor 92 will now assume a conductive state for connecting capacitor 64 and resistor 66 to the emitter terminal 30 of transistor 24 for providing the desired increased time constant. A slowly decaying AGC voltage will thusly be developed at the emitter terminal 30 as represented by waveform 62 of FIG. 2 to enhance the probability of proper data signal recognition. Should the composite sync signal again return to a non-suppressed form, the flip-flop will revert to its logically low output state in response to the low output of inverter 80 for cutting off transistor 92 and returning to the normal short time constant mode of operation. Thus, the circuit will automatically switch between its long and short time constant modes of operation depending upon whether the composite sync signal is or is not characterized by suppressed horizontal sync pulses.

It will be observed that the output of flip-flop 84 is also connected through a resistor 104 and a diode 106 to an input of the gated AGC circuit 52. Since proper gating of the AGC circuit 52 is disrupted in response to a composite sync signal having suppressed horizontal sync components, the high output of the flip-flop is coupled to a gating input of the AGC circuit to gate the circuit for sampling the AGC voltage. The low output produced by the flip-flop in response to a standard video signal or to the non-suppressed sync pulses occurring during the vertical intervals of a scrambled video signal, will not effect AGC gating which is performed in response to the composite sync and flyback signals.

Figure 5:
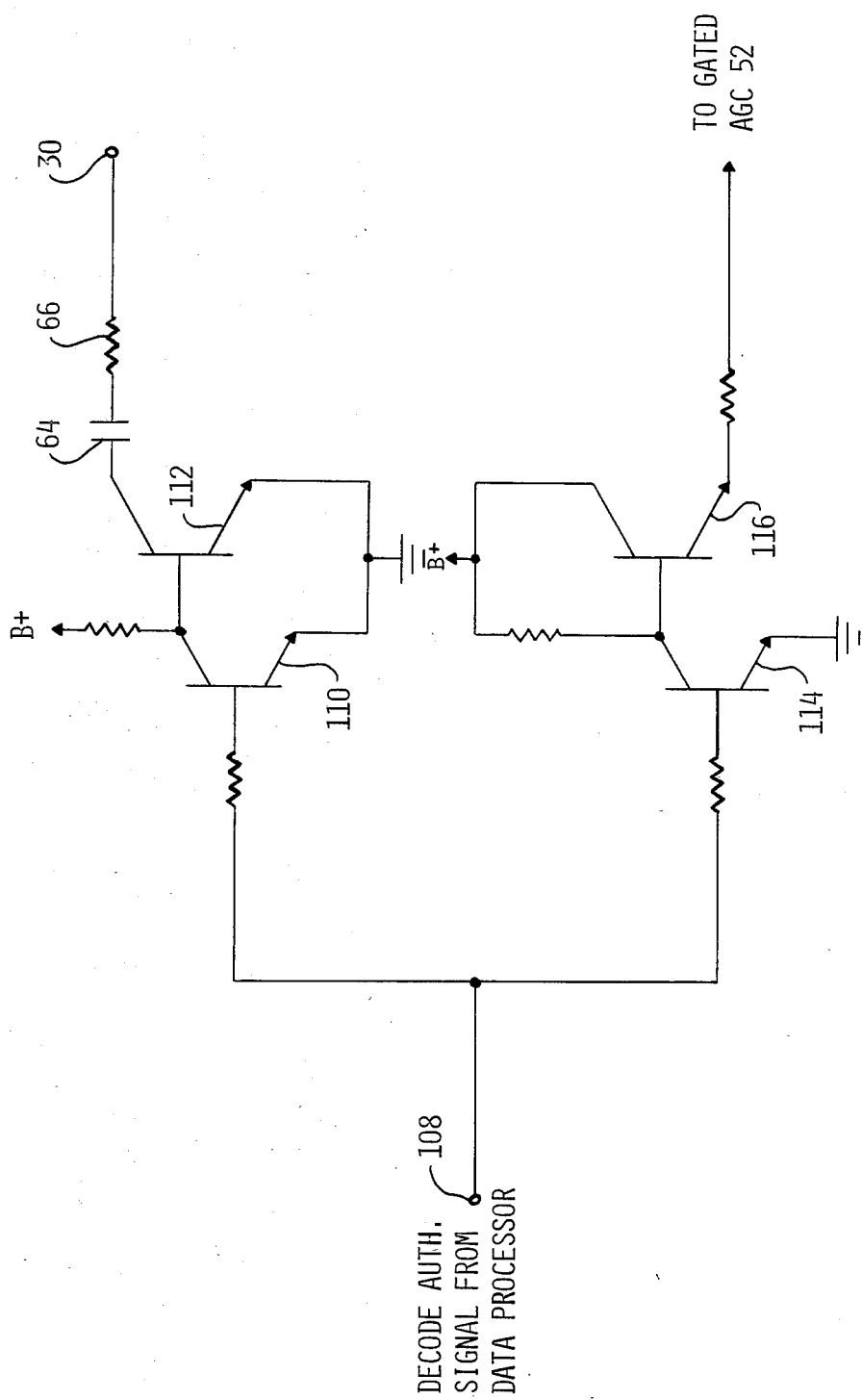
FIG. 5 is a schematic diagram illustrating an alternate embodiment of the invention.

FIG. 5 schematically illustrates an alternate embodiment of the invention. In this circuit, a logic signal is developed at an input terminal 108 by the data processing circuit 18 defining whether or not the subscriber is authorized for decoding scrambled signal transmissions. If the subscriber is so authorized a logically high signal is developed at input terminal 108 and otherwise a logically low level signal is produced. In the case of an authorized subscriber, proper horizontal sync levels are restored by sync restoration circuit 22 so that no time constant compensation is required of the AGC system to facilitate data signal recognition. Thus, the logically high signal at input terminal 108 causes a transistor 110 to conduct which in turn cuts off an output transistor 112 for disconnecting capacitor 64 and resistor 66 from the emitter terminal 30 of transistor 24. At the same time, a transistor 114 is rendered conductive for cutting off a transistor 116 for enabling standard gating of the AGC circuit 52 in response to the composite sync and flyback signals.

In the case of an unauthorized subscriber, however, proper horizontal sync levels are not restored by the decoder so that long time constant compensation of the AGC system according to the invention is required to facilitate data signal recognition. This is accomplished by the logically low signal at input terminal 108 which cuts off transistors 110 and 114 allowing for conduction of transistors 112 and 116. Conducting transistor 112 connects capacitor 64 and resistor 66 to the emitter terminal 30 of transistor 24 to increase the time constant of the RC circuit connected thereto as desired while conducting transistor 116 couples a DC gating signal to AGC circuit 52 as previously described.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. In a subscription television system wherein there is transmitted from a head-end facility a scrambled television signal including fields of video characterized by suppressed horizontal sync pulses and vertical intervals characterized by encoded data signals and non-suppressed sync pulses, an improved addressable decoder comprising:
    means including an IF amplifier for receiving and converting the transmitted television signal to a composite baseband video signal;
    means responsive to the composite baseband video signal for processing the data signals encoded in the vertical intervals thereof;
    means responsive to the composite baseband video signal for developing an AGC voltage having a level substantially corresponding to the sync tip level of the non-suppressed sync pulses during the vertical intervals thereof and decaying during the video fields between successive vertical intervals at a relatively slow rate such that the AGC voltage developed at the beginning of each vertical interval is relatively close to the sync tip level of the non-suppressed sync pulses thereof; and
    means for coupling the AGC voltage for controlling the gain of the IF amplifier, whereby the sync pulses characterizing the vertical intervals of the composite baseband video signal are not subjected to excessive IF gain for facilitating processing of the data signals by the data processing means.

2. An addressable subscription television decoder adapted for decoding a scrambled RF television signal including fields of video characterized by suppressed horizontal sync pulses and vertical intervals characterized by encoded data signals and non-suppressed sync pulses, comprising:
    means including an IF amplifier for converting the RF television signal to a composite baseband video signal;
    AGC means having a relatively short time constant for developing an AGC voltage which decays at a relatively rapid rate during the video fields between successive vertical intervals of the composite baseband video signal;
    means connectable to the AGC means for increasing the relatively short time constant thereof such that an AGC voltage is developed which decays at a relatively slow rate during the video fields for providing an AGC voltage at the beginning of each vertical interval that is relatively close to the AGC voltage provided at the end of the preceding vertical interval;
    means for coupling the developed AGC voltage for controlling the gain of the IF amplifier; and
    switch means for selectively coupling the time constant increasing means to the AGC means, whereby the sync pulses characterizing the vertical intervals of the composite baseband video signal are not subjected to excessive IF gain for facilitating processing of the data signals by the decoder.

3. An addressable subscription television decoder according to claim 2 wherein said means for coupling the developed AGC voltage comprises a gated AGC circuit and including means developing a DC signal for gating the AGC circuit in coincidence with the switch means coupling the time constant increasing means to the AGC means.

4. An addressable subscription television decoder according to claim 2 wherein said AGC means comprises first RC circuit means characterized by said short time constant and transistor means having an input electrode for receiving the composite baseband video signal and a first output electrode coupled to the first RC circuit means and wherein said time constant increasing means comprises second RC circuit means selectively connectable to the first RC circuit means by the switch means.

5. An addressable subscription television decoder according to claim 4 wherein the transistor means includes a second output electrode developing a composite sync signal and wherein the switch means comprises first means responsive to the AGC voltage reflecting a transition from nominal to suppressed level horizontal sync pulses for coupling the second RC circuit means to the first RC circuit means and second means responsive to the composite sync signal transitioning from suppressed to nominal level horizontal sync pulses for decoupling the second RC circuit means from the first RC circuit means.

6. An addressable subscription television decoder according to claim 5 including bi-stable switch means responsive to said first and second means for coupling and de-coupling the second RC circuit means from the first RC circuit means.

7. An addressable subscription television decoder according to claim 6 wherein the means for coupling the developed AGC voltage comprises a gated AGC circuit and including means responsive to the bi-stable switch means for developing a DC signal for gating the AGC circuit in coincidence with coupling the second RC circuit means to the first RC circuit means.

8. An addressable subscription television decoder adapted for decoding a scrambled RF television signal including fields of video characterized by suppressed horizontal sync pulses and vertical intervals characterized by encoded data signals and non-suppressed sync pulses, comprising:

means including an IF amplifier for converting the RF television signal to a composite baseband video signal;

transistor means having an input terminal coupled for receiving the composite baseband video signal and first and second ouptut terminals, the first ouptut terminal being connected for developing a composite sync signal;

first RC circuit means coupled to the second output terminal of the transistor means and having a relatively short time constant for developing an AGC voltage at said second ouptut terminal which decays at a relatively rapid rate during the video fields between successive vertical intervals of the composite baseband video signal;

second RC circuit means connectable to the first RC circuit means for increasing the relatively short time constant thereof such that an AGC voltage is developed at said second output terminal which decays at a relatively slow rate during the video fields for providing an AGC voltage at the beginning of each vertical interval that is relatively close to the AGC voltage provided at the end of the preceding vertical interval;

a gated AGC circuit for coupling the developed AGC voltage for controlling the gain of the IF amplifier; and switch means responsive to the composite sync signal developed at the first output teminal and the AGC voltage developed at the second output terminal for coupling the second RC circuit means to the first RC circuit means and for developing a DC signal for gating the AGC circuit whenever the composite baseband video signal is characterized by suppressed horizontal sync pulses and otherwise de-coupling the second RC circuit means from the first RC circuit means while inhibiting development of the DC gating signal.

9. An addressable decoder according to claim 8 wherein the switch means comprises first means responsive to the AGC voltage reflecting a transition from nominal to suppressed level horizontal sync pulses for coupling the second RC circuit means to the first RC circuit means and second means responsive to the composite sync signal transitioning from suppressed to nominal level horizontal sync pulses for de-coupling the second RC circuit means from the first RC circuit means.

10. An addressable decoder according to claim 9 including bi-stable switch means responsive to the first and second means for coupling and de-coupling the second RC circuit means from the first RC circuit means.

11. An addressable decoder according to claim 10 including means responsive to the bi-stable means for developing the DC gating signal.

12. In a subscription television system wherein there is transmitted from a head-end facility a scrambled television signal including fields of video characterized by suppressed horizontal sync pulses and vertical intervals characterized by encoded data signals and non-suppressed sync pulses, an improved addressable decoder comprising:

means including an IF amplifier for receiving and converting the tramsmitted television signal to a composite baseband video signal;

means responsive to the composite baseband video signal for processing the data signals encoded in the vertical intervals thereof;

means responsive to the composite baseband video signal for developing an AGC voltage having a level substantially corresponding to the sync tip level of the non-suppressed sync pulses during the vertical intervals thereof and means for preventing said AGC voltage from rapidly decaying during the video fields between successive vertical intervals such that the AGC voltage developed at the beginning of each vertical interval is relatively close to the sync tip level of the non-suppressed sync pulses thereof; and means for coupling the AGC voltage for controlling the gain of the IF amplifier, whereby the sync pulses characterizing the vertical intervals of the composite baseband video signal are not subjectd to excessive IF gain for facilitating processsing of the data signals by the data processing means.

* * * * *